US008944481B2

(12) United States Patent
Collado Jiménez et al.

(10) Patent No.: US 8,944,481 B2
(45) Date of Patent: Feb. 3, 2015

(54) GRIPPING DEVICE FOR MANIPULATING FLEXIBLE ELEMENTS

(75) Inventors: Valentin Collado Jiménez, Zamudio (ES); Oihane Beloki Zubiri, Zamudio (ES); Riccardo Mezzacasa Lasarte, San Sebastian (ES); Francisco José Estensoro Astigarraga, San Sebastian (ES); Jose Ramon Garcia Martinez, San Sebastian (ES); Miguel Segura Moreno, San Sebastian (ES); Xabier Irastorza Arregui, San Sebastian (ES)

(73) Assignee: Fundacion Tecnalia Research & Innovation, Zamudio (ES)

( * ) Notice: Subject to any disclaimer, the term of this patent is extended or adjusted under 35 U.S.C. 154(b) by 0 days.

(21) Appl. No.: 13/977,588

(22) PCT Filed: Dec. 31, 2010

(86) PCT No.: PCT/ES2010/070880
§ 371 (c)(1),
(2), (4) Date: Sep. 17, 2013

(87) PCT Pub. No.: WO2012/089859
PCT Pub. Date: Jul. 5, 2012

(65) Prior Publication Data
US 2014/0008928 A1    Jan. 9, 2014

(51) Int. Cl.
*B66C 1/02*    (2006.01)
*B25J 9/02*    (2006.01)
(Continued)

(52) U.S. Cl.
CPC .............. *B25J 9/023* (2013.01); *B25J 15/0061* (2013.01); *B25J 15/0616* (2013.01); *B25J 15/0052* (2013.01)
USPC ........................................... 294/65; 294/185

(58) Field of Classification Search
USPC ........ 294/65, 185; 414/627, 737; 271/90–107
See application file for complete search history.

(56) References Cited

U.S. PATENT DOCUMENTS 3,102,751 A * 9/1963 Noble et al. .................... 294/65
4,129,328 A * 12/1978 Littell ............................ 294/65
(Continued)

FOREIGN PATENT DOCUMENTS

DE    102008044948 A1 *  3/2009  ............... B65H 3/08
WO    2010097098 A1    9/2010

OTHER PUBLICATIONS

Kordi et al., Development of a Multifunctional Robot End-Effector System for Automated Manufacture of Textile Preforms, Department of Mechanism Theory and Machine Dynamics (IGM) of the TWTH University of Aachen, Germany—http://www.igm.rwth-aachen.de/ "published in the conferences Advanced intelligent mechatronics, 2007 IEEE/ASME", ISBN: 978-1-4244-1263-1, pp. 1-6 (2007).
(Continued)

*Primary Examiner* — Saul Rodriguez
*Assistant Examiner* — Gabriela Puig
(74) *Attorney, Agent, or Firm* — Kunzler Law Group, PC

(57) ABSTRACT

A gripping device for manipulating flexible elements includes a main rack and a plurality of gripping elements coupled in the main rack by respective operating mechanisms for gripping a flexible element. The gripping device includes at least four gripping elements for gripping the flexible element. At least one gripping element is a multiposition gripping element independently displaceable by a displacement system assembled in the main rack and a vertical operating mechanism. At least two of the other gripping elements are independently displaceable in any direction by respective two-way additional displacement systems assembled in the main rack. The gripping elements are automatically adjustable in their respective positions such that they are arranged in one and the same plane for capturing the flexible element in a flat two-dimensional configuration and movable to generate a three-dimensional configuration in the flexible element without generating stretching forces on the flexible element.

42 Claims, 9 Drawing Sheets

(51) Int. Cl.
  *B25J 15/00* (2006.01)
  *B25J 15/06* (2006.01)

(56) References Cited

U.S. PATENT DOCUMENTS

| | | | |
|---|---|---|---|
| 5,609,377 A * | 3/1997 | Tanaka | 294/65 |
| 5,794,329 A * | 8/1998 | Rossmeisl et al. | 29/743 |
| 6,213,709 B1 * | 4/2001 | Hebrank | 414/737 |
| 6,860,531 B2 * | 3/2005 | Sherwin | 294/2 |
| 6,863,323 B2 * | 3/2005 | Neveu | 294/65 |
| 7,029,046 B2 * | 4/2006 | Lim | 294/65 |
| 7,281,739 B2 * | 10/2007 | Kniss | 294/65 |
| 7,604,231 B2 * | 10/2009 | Yuen et al. | 271/106 |
| 8,321,051 B2 * | 11/2012 | Ago et al. | 700/228 |
| 8,371,631 B2 * | 2/2013 | Lin | 294/65 |
| 8,684,418 B2 * | 4/2014 | Lin et al. | 285/147.1 |
| 2007/0233320 A1 | 10/2007 | Waldmann et al. | |
| 2008/0080962 A1 | 4/2008 | Holtmeier | |
| 2010/0007065 A1 | 1/2010 | Reinhold et al. | |
| 2010/0140969 A1 | 6/2010 | Lin et al. | |
| 2012/0181740 A1 * | 7/2012 | Eschlbeck et al. | 271/91 |
| 2012/0181804 A1 * | 7/2012 | Schmidt et al. | 294/185 |

OTHER PUBLICATIONS

PCT/ES2010/070880 International Search Report and Written Opinion mailed Oct. 18, 2011.

* cited by examiner

GRIPPING DEVICE FOR MANIPULATING FLEXIBLE ELEMENTS

TECHNICAL FIELD OF THE INVENTION

The present invention is encompassed in the technical field of the devices used as end effectors in industrial robots, and is particularly applicable in the manufacture of materials or parts molded from a preform formed from a plurality of flexible fabrics.

BACKGROUND OF THE INVENTION

A technique commonly used in the manufacture of composites starts from a preform formed by several fabric layers comprising reinforcement fibers (carbon fibers, glass fibers, etc.). These fabrics or layers which are placed on a forming mold gradually bond to one another by means of a binder which is applied at determined points, and then the mold is closed, which will provide the preform with the end shape by means of applying heat and pressure during a determined time period.

The different fabric layers are of flexible fabrics with patterns with a two-dimensional geometry, i.e., they have the shape and size suitable for the composite part to be obtained. In industrial practice, the two-dimensional fabric layers are typically placed manually on the mold because it is necessary to correctly place them and gradually fix them to one another.

If this process is to be automated, a manipulator which grasps the different two-dimensional fabric layers or patterns and takes them to the forming mold can be used, but once there, the manipulator has to let them fall onto the mold so good placement of the layers cannot be assured, especially when the mold has a complex geometry.

Manipulators which allow grasping and transporting flexible elements by means of vacuum suction cups or similar elements are known today, but they all have the problem that they cannot assure good placement of the fabrics in the mold or automatically apply adhesive between the different fabric layers. Thus, patent application US2010007065A1 describes a gripping device containing a frame in which a device configured to grasp and maintain at least one carbon fiber fabric is included. This frame further contains another device for draping the carbon fiber fabric on the mold. On the other hand, patent application US2008080962A1 describes another similar device for transporting limp objects such as carbon fiber fabrics or the like, comprising a surface by means of which the fabric is grasped. This surface is made up of different elements which will or will not begin operating, depending on the shape and dimensions of the fabric to be grasped. Although these devices allow grasping carbon fiber fabrics with different shapes and placing them on a mold, this is only possible provided that the shape of the mold is simple. The holding elements do not have relative movement with respect to one another, therefore the fabric will be draped on the mold by releasing it thereon, therefore not being able to assure that the fabric will adapt well to the shape of the mold. Likewise, the article by Tarsha Kordi, M. et al. (Department of Mechanism Theory and Machine Dynamics (IGM) of the TWTH University of Aachen, Germany—http://www.igm.r-wth-aachen.de/): "Development of a Multifunctional Robot End-Effector System for Automated Manufacture of Textile Preforms", published in the conferences "Advanced intelligent mechatronics, 2007 IEEE/ASME", ISBN: 978-1-4244-1263-1, pages 1-6 (2007) describes a gripping device comprising a support structure in which are articulated respective pantographic type side racks and suction, cold or needle gripping element carriers, which allows grasping a fabric in a two-dimensional plane and placing it on a three-dimensional mold. Some of the gripping elements are assembled on arms which can pivot with respect to the support structure, and thus bend the textile preform at its ends, forming an angle with the central part of the textile preform. Also in this case, the adaptation of the fabric to the mold is only possible for simple three-dimensional shapes.

DESCRIPTION OF THE INVENTION

The object of the present invention is to overcome the drawbacks of the prior art described above by means of a gripping device for manipulating flexible elements, coupleable to a robot arm as an end effector, comprising a main rack and a plurality of gripping elements coupled in the main rack by means of respective operating mechanisms for gripping and manipulating a flexible element at different points, characterized in that it comprises at least four gripping elements for gripping the flexible element;

at least one gripping element is a multiposition gripping element independently displaceable by means of at least one displacement system with respect to the other gripping elements in at least one direction parallel to the plane defined by three other gripping elements and in a perpendicular direction to said plane by means of a vertical operating mechanism;

at least two of the three gripping elements defining the aforementioned plane are independently displaceable in any direction within said plane by means of two-way displacement systems assembled in the main rack;

the gripping elements are adjustable automatically in their respective positions such that all are arranged in one and the same plane for capturing the flexible element in a flat two-dimensional configuration and, once captured, are capable of moving such that they can generate in the flexible element three-dimensional shapes, such as for example "complex" three-dimensional shapes, "complex" shapes being understood as three-dimensional surfaces which include at least one concave region and another convex region, without the movements of the gripping elements generating stretching forces on the flexible element.

As it is used in the present specification and in the claims, the term "flexible element" means a non-rigid and flexible element, such as for example patterns, fabrics or flexible layers, such as those which are used, for example, in the manufacture of composites in a preform formed by several overlain patterns, layers or fabrics which can comprise reinforcement fibers (carbon fibers, glass fibers, etc.) and which, after placed on a forming mold, can gradually bond to one another by means of a binder which is applied at determined points, and then the mold is closed, providing the final shape to the preform, or PREPREG layers i.e., reinforced fabric layers which also incorporate a curing resin.

The multiposition gripping element comprises a vertical operating mechanism for displacing it in the perpendicular direction. Preferably, the system further comprises respective additional vertical operating mechanisms connected to at least some of, and preferably all, the other gripping elements for displacing those gripping elements in the perpendicular direction. According to the invention, at least one of the gripping elements and preferably all of them can be conventional suction cups connected to a vacuum generating system. Alternatively, some or all of the gripping elements can be gripping elements such as needle grippers or cryo-gripping devices.

Preferably, the gripping device according to the invention comprises, seen in the longitudinal direction of the main rack, at least one front gripping element and at least one rear gripping element, the multiposition gripping element being assembled between at least one front gripping element and at least one rear gripping element.

According to the invention, the front gripping element or at least some of them can be assembled in a front longitudinal displacement system which is in turn assembled in the main rack, such that the front gripping elements are displaceable in the longitudinal direction of the main rack towards the multiposition gripping element. Alternatively or additionally, the front gripping element or elements can be assembled in a front transverse displacement system also assembled in the main rack or on the structural element which is longitudinally displaced, such that they are displaceable in the transverse direction of the main rack. Likewise, the front gripping element or at least some of them can be pivotable in an angle in a plane corresponding to the transverse direction of the main rack.

In a preferred embodiment of the invention, the gripping device comprises two end front gripping elements, which can be assembled in the main rack through a front longitudinal displacement system for jointly displacing the end front gripping elements in the longitudinal direction towards the multiposition gripping element. These end front gripping elements can likewise be assembled in the front longitudinal displacement system each by means of a front transverse displacement system, such that each of the end front elements is individually displaceable in the transverse direction of the main rack. Also in this case, at least one and preferably both of the end front gripping elements are pivotable by the mentioned angle in the plane corresponding to the transverse direction of the main rack.

At least one intermediate front gripping element, which can be assembled between the two end front gripping elements in the front longitudinal displacement system, can be arranged between the two end front gripping elements. The intermediate front gripping element can be fixedly assembled in the front longitudinal displacement system.

Preferably, the front gripping elements are assembled in respective vertical operating mechanisms for moving the front gripping elements in the perpendicular direction.

On the other hand, the rear gripping element or elements can be assembled in a rear longitudinal displacement system which in turn is assembled in the main rack, such that the rear gripping elements are displaceable in the longitudinal direction of the main rack towards the multiposition gripping element. Also alternatively or additionally, the rear gripping element or at least some of them can be assembled in a rear transverse displacement system which in turn is assembled in the rear longitudinal displacement system, such that at least some of the rear gripping elements are displaceable in the transverse direction of the main rack. The rear gripping element or at least some of them can be pivotable in an angle in a plane corresponding to the transverse direction of the main rack.

Preferably, the gripping device according to the invention comprises two end rear gripping elements, which can be assembled in the main rack through a rear longitudinal displacement system for jointly displacing the end rear gripping elements in the longitudinal direction towards the multiposition gripping element. The end rear gripping elements can also each be assembled in the rear longitudinal displacement system by means of a rear transverse displacement system, such that each of the end rear elements is individually displaceable in the transverse direction of the main rack. At least one of the end rear gripping elements can be pivotable in an angle in a plane corresponding to the transverse direction of the main rack.

At least one intermediate rear gripping element, which can be assembled between the two end rear gripping elements in the rear longitudinal displacement system, can be arranged between the two end rear gripping elements. The intermediate rear gripping element can be fixedly assembled in the rear longitudinal displacement system.

Preferably, the rear gripping elements are assembled in respective vertical operating mechanisms for moving the rear gripping elements in the perpendicular direction.

The gripping device according to the invention can further comprise at least one side gripping element assembled between said at least one front gripping element and said at least one rear gripping element, such as for example, a left side gripping element and a right side gripping element, such that the multiposition gripping element is assembled between the left side gripping element and the right side gripping element. Preferably, each side gripping element is assembled in the main rack by means of a side transverse displacement system. At least one and preferably all of the side gripping elements can be pivotable by the angle in the plane corresponding to the transverse direction of the main rack. Preferably, the side gripping elements are assembled in respective vertical operating mechanisms for moving the side gripping elements in the perpendicular direction.

In a preferred embodiment of the invention, the vertical operating mechanism for the multiposition gripping element can be assembled in a vertical support displaceable in the transverse direction by means of a transverse displacement system for displacing the multiposition gripping element in the transverse direction, the transverse guiding system is assembled in a longitudinal displacement system for displacing the multiposition gripping element in the longitudinal direction and the longitudinal displacement system is assembled in a sub-structure assembled in the main rack such that the multiposition gripping element is displaceable between the other gripping elements In this embodiment, the transverse displacement system for displacing the multiposition gripping element can comprise a transverse guiding system and a transverse drive motor. This transverse guiding system can comprise, for example, a transverse guide and a transverse screw which rotates in the vertical support and is connected to the transverse drive motor.

On the other hand, the longitudinal displacement system can comprise a pair of longitudinal tracks, spaced from one another, in which respective carriages with respective lower vertical extensions in which is assembled the transverse displacement system, as well as respective longitudinal drive motors for displacing the carriages in the longitudinal guides, are displaced. Thus, for example, each longitudinal track can comprise a longitudinal guide and a longitudinal screw which rotates in one of the carriages and is connected to one of the longitudinal drive motors.

The sub-structure can in turn be assembled between a front upper cross-piece, a rear upper cross-piece, a left upper stringer and a right upper stringer of the main rack, and can comprise at least one front cross-bar and at least one rear cross-bar on which the longitudinal tracks are assembled at their respective ends. Such sub-structure can comprise a left front cross-bar joined to the left upper stringer, a right front cross-bar joined to the right upper stringer, a left rear cross-bar joined to the left upper stringer, and a right rear cross-bar joined to the right upper stringer. The front cross-bars and the rear cross-bars can be arranged such that their respective free ends are facing and spaced from one another, and can be joined to the front upper cross-piece by means of respective front longitudinal bars and the rear cross-bars are joined to the rear upper cross-piece by means of respective rear longitudinal bars, such that the ends of each longitudinal track are joined respectively to one of the front cross-bars and to one of the rear cross-bars.

As can be understood from the foregoing, the gripping device according to the present invention has a series of gripping elements such as, for example, suction cups, which can grasp a textile preform or flexible element in a two-dimensional plane and move for generating complex three-dimensional shapes therein and placing it on a three-dimensional mold. Due to the degrees of liberty with which the gripping elements can be displaced in the longitudinal, transverse and vertical plane during the transport of the textile preform towards the forming mold, the gripping means move to give the textile preform a three-dimensional shape which approximates the three-dimensional shape of the mold, without subjecting the flexible element to a substantial stretching force, i.e., without the distance between the gripping points measured on the fabric varies substantially. The three-dimensional shapes that can be conferred to the flexible element range from simples bends to, depending on the number of activatable gripping elements, complex three-dimensional shapes.

The gripping device can further be provided with an adhesive applicator module, such as a sprayer for example, for applying adhesive in the flexible elements which are gradually placed one on top of the other in the forming mold. To achieve good adhesion between those flexible elements, the central multiposition suction cup can be used. Therefore, once the flexible element is in the mold, the vacuum is cut off in the central multiposition suction cup such that it is released from the flexible element, and is positioned to apply pressure by means of stamping at the points in which the adhesive has previously been applied. The other suction cups will continue applying pressure to the flexible element on the mold until the stamping process has ended, thus assuring good positioning of the flexible element at all times. For the purpose of assuring that the flexible element has been correctly placed, the gripping device can further incorporate a computer vision module which, after taking several photographs of the flexible element in place, indicates whether or not the placement was suitable, for thus being able to prevent the placement of the next flexible elements when a flexible element is not correctly placed.

In view of the foregoing, it is observed that the present invention solves the drawbacks of the prior art by means of an effective gripping device.

BRIEF DESCRIPTION OF THE DRAWINGS

Aspects and embodiments of the invention are described below based on drawings in which.

Figure 1:
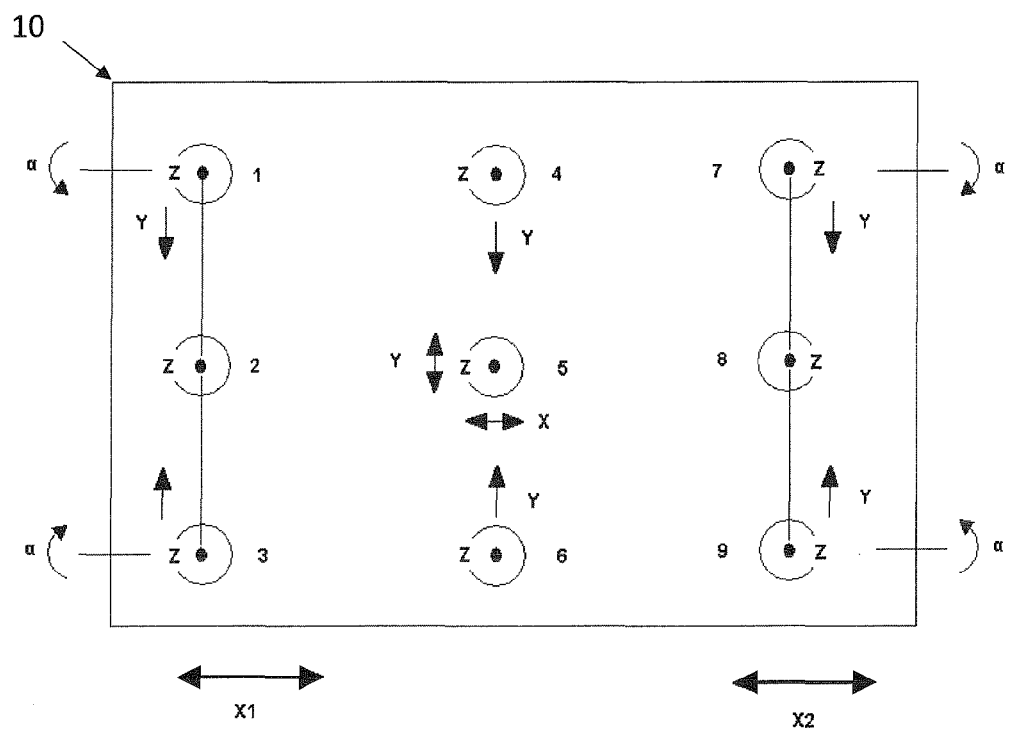
FIG. 1 is an upper plan schematic view of an embodiment of the invention in which the gripping device comprises nine suction cups.
Figure 2:
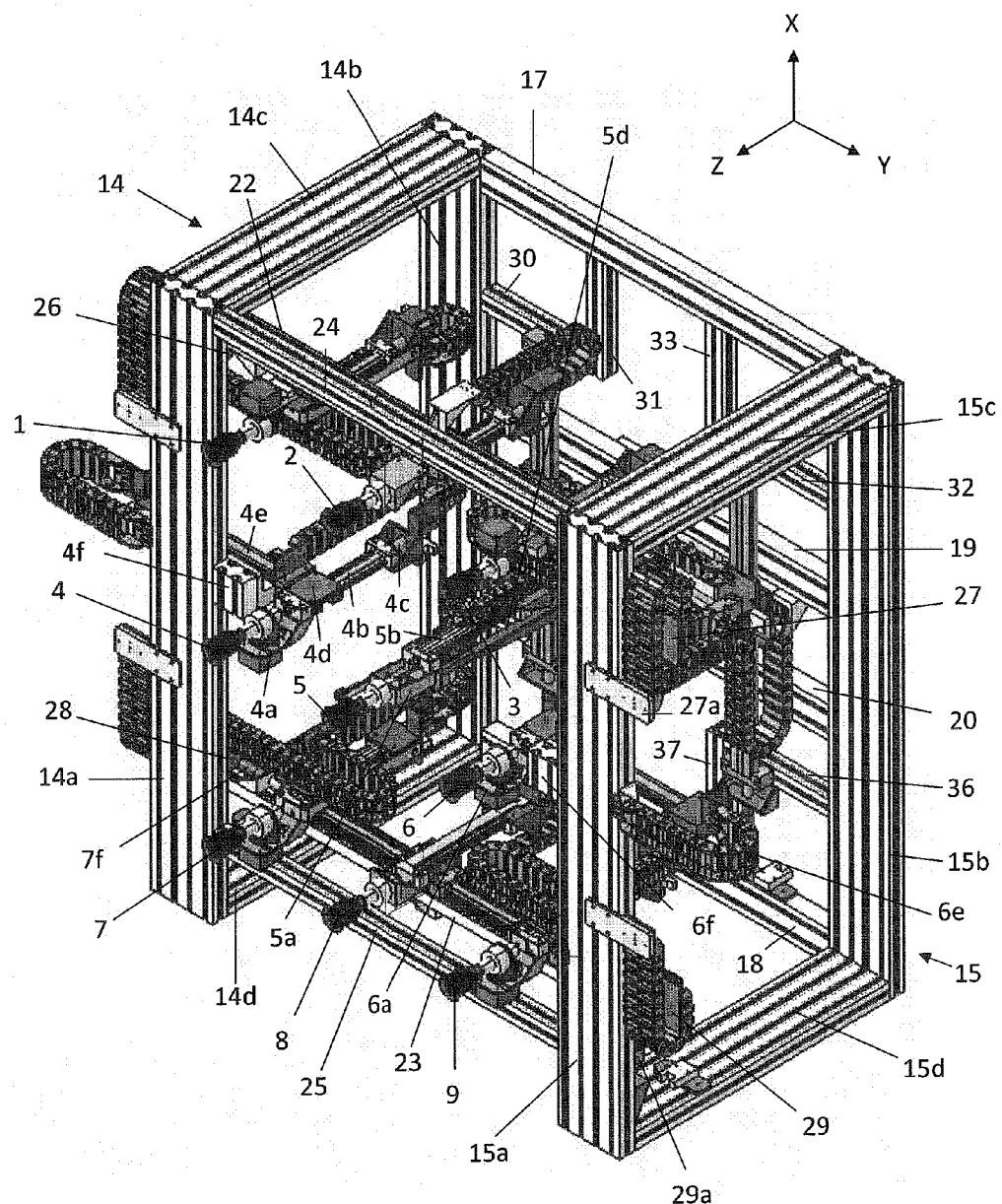
FIG. 2 is a bottom perspective view from the front part of an embodiment of the gripping device with nine suction cups.

Reference numbers identifying the following elements are shown in these figures:

1 left end front suction cup
1a holding block
1b vertical operation
1c drive motor
1d front transverse runner
1e transverse operation
1f drive motor
2 intermediate front suction cup
2a holding block
2b vertical operation
2c drive motor
2d fixing device
2e fixing flat bar
3 right end front suction cup
3a holding block
3b vertical operation
3c drive motor
3d front transverse runner
3e transverse operation
3f drive motor
4 left side intermediate suction cups
4a holding block
4b vertical operation
4c drive motor
4d guiding block
4e transverse operation
4f transverse guide profile
4g drive motor
5 central multiposition suction cup
5a holding block
5b vertical operating mechanism
5c drive motor
5d vertical support
6 intermediate right side suction cup
6a holding block
6b vertical operation
6c drive motor
6d guiding block
6e transverse operation
6f transverse guide profile
6g drive motor
7 left end rear suction cup
7a holding block
7b vertical operation
7c drive motor 7d rear transverse runner
7e transverse operation
7f drive motor
8 intermediate rear suction cup
8a holding block
8b vertical operation
8c drive motor
8d fixing device
8e fixing flat bar
9 right end rear suction cup
9a holding block
9b vertical operation
9c drive motor
9d rear transverse runner
9e transverse operation
9f drive motor
10 flexible fabric
11 three-dimensional forming mold
12 applicator module
12a automatic rotating actuator
12b operating actuator
13 computer vision module
13a, 13b cameras
13c, 13d illumination lamps
14 left side frame
14a left lower stringer
14b left upper stringer
14c left front post
14d left rear post
15 right side frame
15a right lower stringer
15b right upper stringer
15c right front post
15d right rear post
16 transverse guiding system
17 front upper end cross-piece
18 rear upper end cross-piece
19 intermediate upper cross-piece
20 intermediate upper cross-piece
21 coupling sheet
22 first mobile cross-piece
23 second mobile cross-piece
24 front lower end cross-piece
25 rear lower end cross-piece
26 first left upper runner
27 first right upper runner
28 second left upper runner
28a drive motor
28b operating screw
29 second right upper runner
29a drive motor
29b operating screw
30 left front cross-bar
31 left front longitudinal bar
32 right front cross-bar
33 right front longitudinal bar
34 left rear cross-bar
35 left rear longitudinal bar
36 right rear cross-bar
37 right rear longitudinal bar
38 drive motor
39 left longitudinal operating carriage
39a lower vertical extension
40 right longitudinal operating carriage
40a lower vertical extension
41 left longitudinal guiding bar
42 right longitudinal guiding bar
43a first left coupling body
43b first right coupling body
44a second left coupling body
44b second right coupling body
45a, 45b drive motor

EMBODIMENTS OF THE INVENTION

Figure 3:
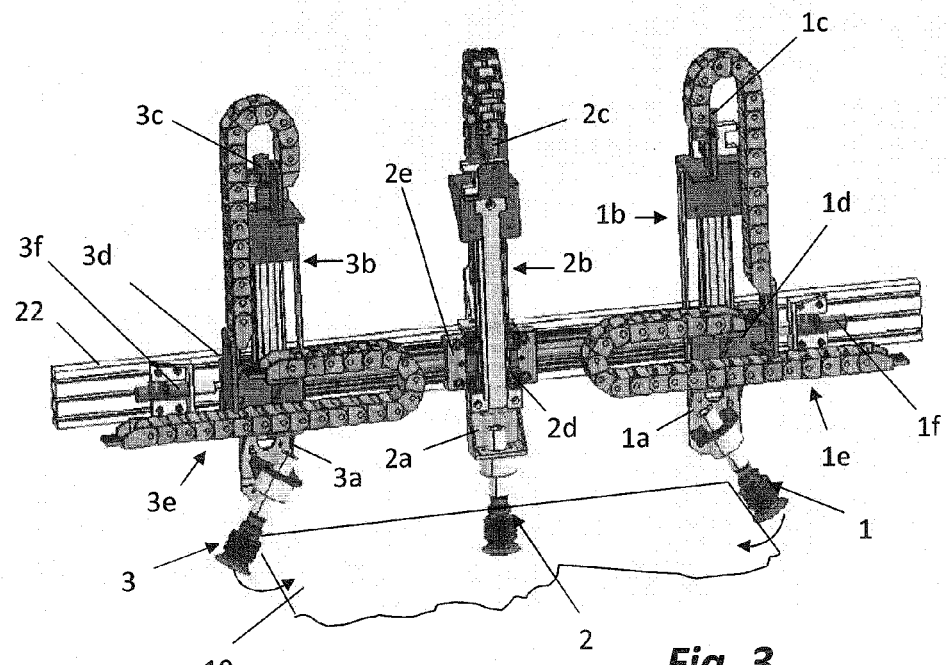
FIG. 3 is a partial view showing the three front suction cups of the gripping device shown in FIG. 2 in an initial position for capturing a flexible fabric.
Figure 4:
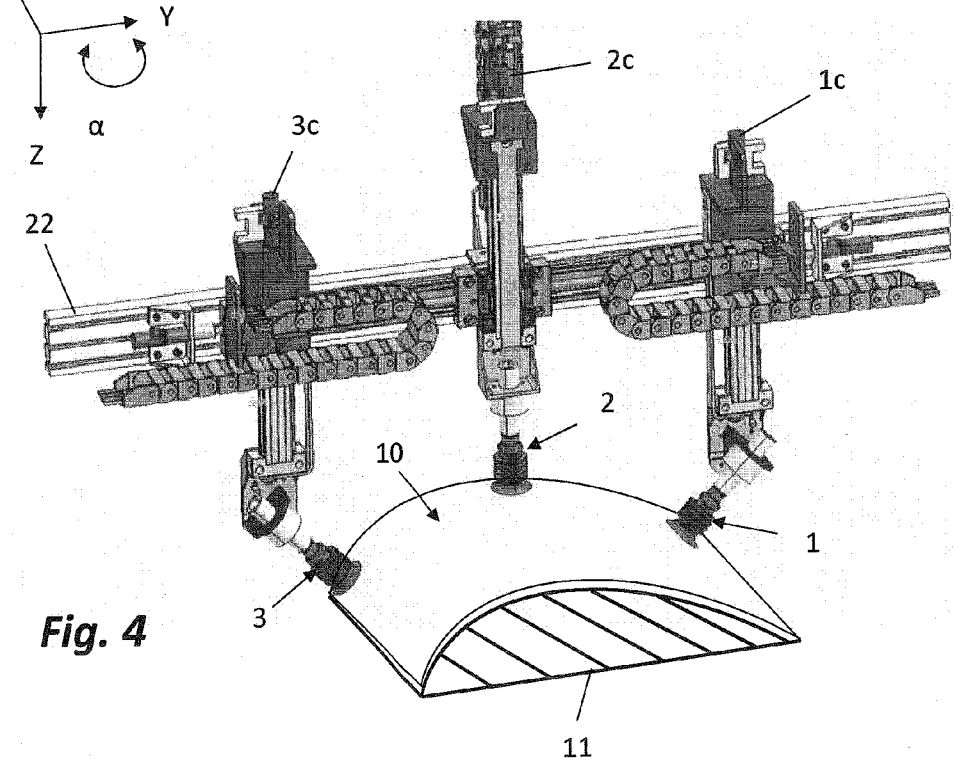
FIG. 4 is a partial view showing the three front suction cups of the gripping device shown in FIG. 2 in an end position right before placing the flexible fabric on a mold.

In the embodiment shown in the drawings, the gripping device comprises nine holding elements in the form of suction cups -1, 2, 3, 4, 5, 6, 7, 8, 9- for holding a flexible fabric -10- which the device captures with a two-dimensional geometry (FIGS. 1, 3, 5) and places in a three-dimensional forming mold -11- (FIG. 4, 6).

The suction cups -1, 2, 3, 4, 5, 6, 7, 8, 9- are arranged according to a 3×3 matrix connected to a conventional vacuum system, and have relative movement with respect to one another in planes corresponding to the coordinates X, Y and Z, corresponding respectively to the longitudinal direction -X-, the transverse direction -Y- with respect to the three-dimensional mold -11- in which the flexible fabric -10- is placed, and in the vertical direction -Z-, perpendicular to planes -X- and -Y-.

As can especially be seen in FIG. 1, the suction cups -1-, -2- and -3- are joined in the longitudinal movement in direction -X1- whereas the suction cups -7-, -8- and -9- are joined in their longitudinal movement in direction -X2-. The suction cups 4 and 6 do not have the possibility of moving in the longitudinal direction -X-. Taking this configuration into account, when adjusting the movement in the longitudinal direction -X-, the suction cups -1, 2, 3- and the suction cups -7, 8, 9- will be moved from and towards the center, where X1=X2. The suction cups -4- and -6- will therefore always be longitudinally centered in direction -X-. Concerning the transverse movement in direction -Y-, the suction cups -2- and -8- are fixed. The suction cups -1- and -3- are displaceable from and towards the suction cup -2-, whereas the suction cups -7- and -9- are displaceable from and towards the suction cup -8-. Each of the suction cups -1-, -3-, -7-, -9- is transversely displaceable in direction -Y- independently, which allows working with non-symmetrical molds according to the plane X-Z. Likewise, the outer suction cups -1-, -3-, -4-, -6-, -7-, -9- can pivot in an arc of angle α in the transverse plane -Y-Z. In turn, the central multiposition suction cup -5- can move in a completely independent manner from the other ones in directions -X-, -Y- and -Z-.

Figure 5:
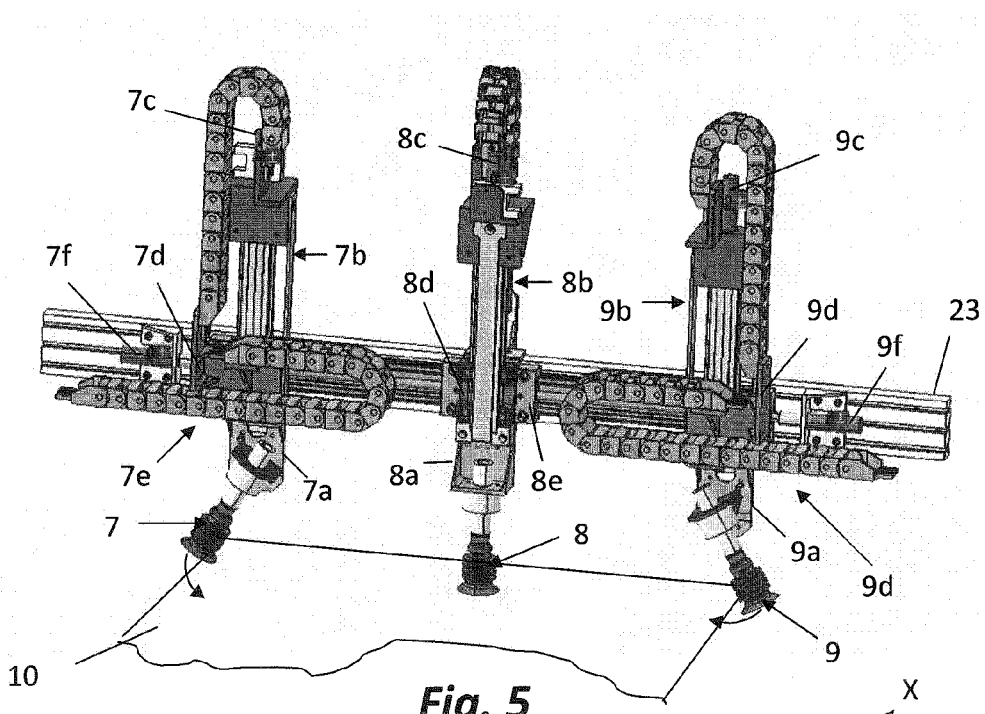
FIG. 5 is a partial view showing the three rear suction cups of the gripping device shown in FIG. 2 in an initial position for capturing the flexible fabric.
Figure 6:
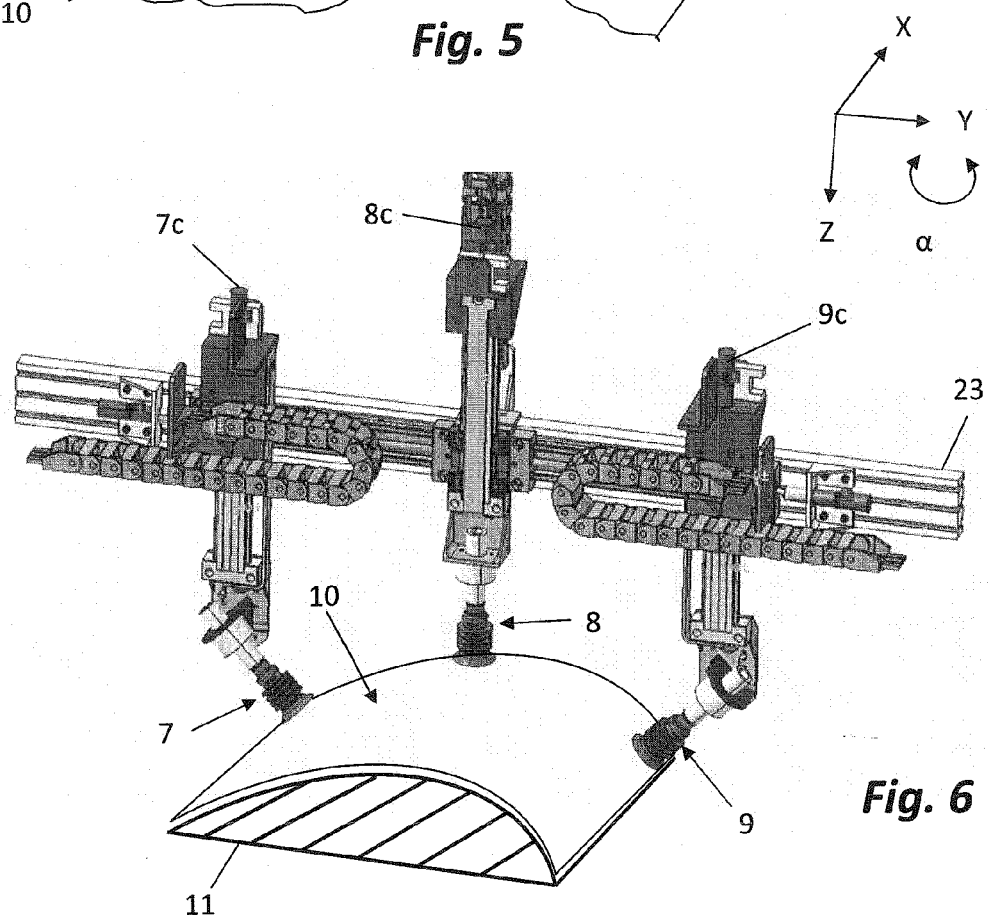
FIG. 6 is a partial view showing the three rear suction cups of the gripping device shown in FIG. 2 in an end position right before placing the flexible fabric on a mold.
Figure 7:
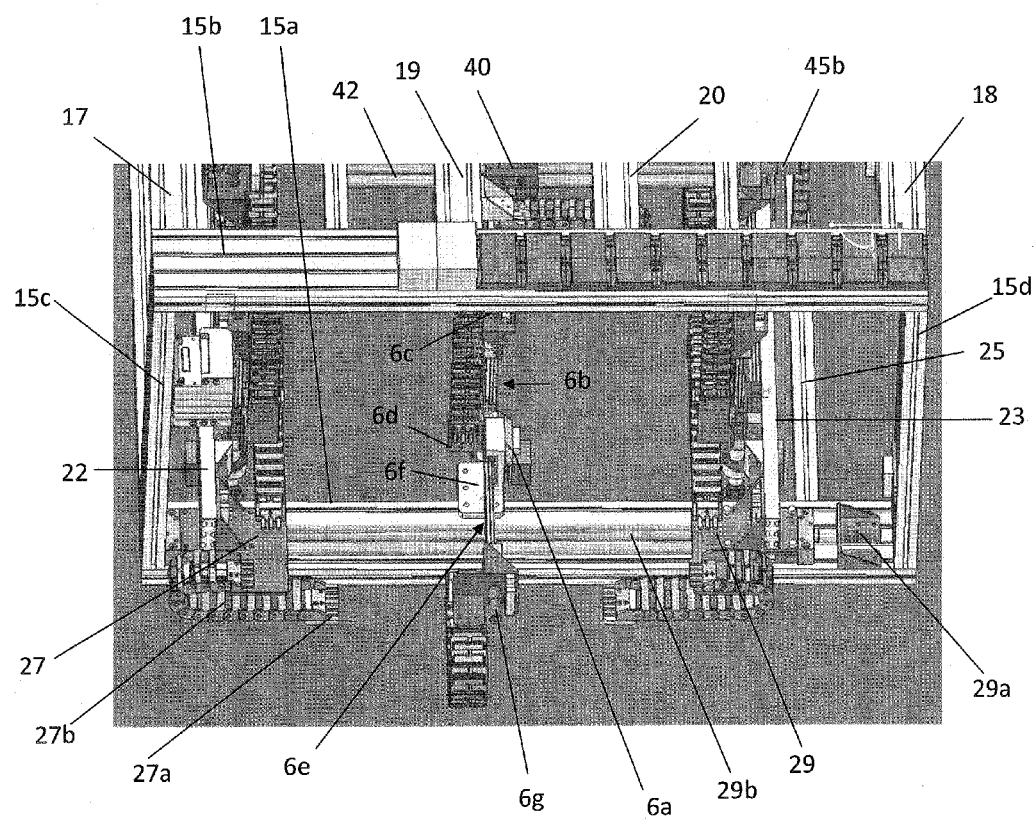
FIG. 7 is an upper partial perspective view of the right side of the gripping device shown in FIG. 2.
Figure 8:
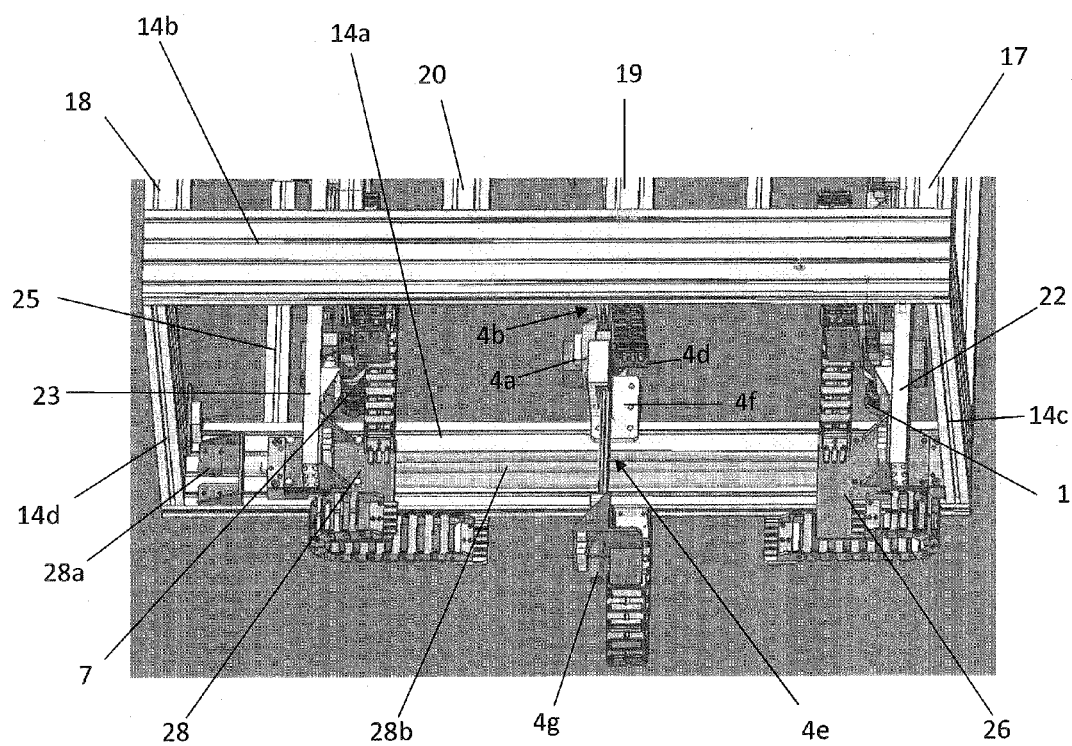
FIG. 8 is an upper partial perspective view of the left side of the gripping device shown in FIG. 2.

With this configuration of suction cups and movements, the strategy for the capture and placement of the fabric -10- is as follows: In the first place, the suction cups will move in directions -X- and -Y- until they are distributed on the edge of the fabric -10-. This movement will be performed in two dimensions. The vacuum will then be activated in the suction cups so that they can capture the fabric -10-. If needed, the suction cups -1-, -3-, -4-, -6-, -7- and -9- can rotate outwardly in the transverse plane -Y- in an angle -α-, for assuring the capture of a single fabric -10- (FIGS. 3, 5). Once the fabric -10- is captured, each of the suction cups -1-, -2-, -3-, -4-, -5-, -6-, -7-, -8-, -9- will move in the planes X, Y and Z and, in the case of the outer suction cups -1-, -2-, -3-, -4-, -6-, -7-, -8-, -9- in the angle α, for forming an end shape with the fabric -10- that is as similar as possible to that of the mold -11- (FIGS. 4, 6). Finally, the fabric -10- will be draped on the mold -11-, pressing it onto the mold -11- at the gripping points.

Figures 9, 10:
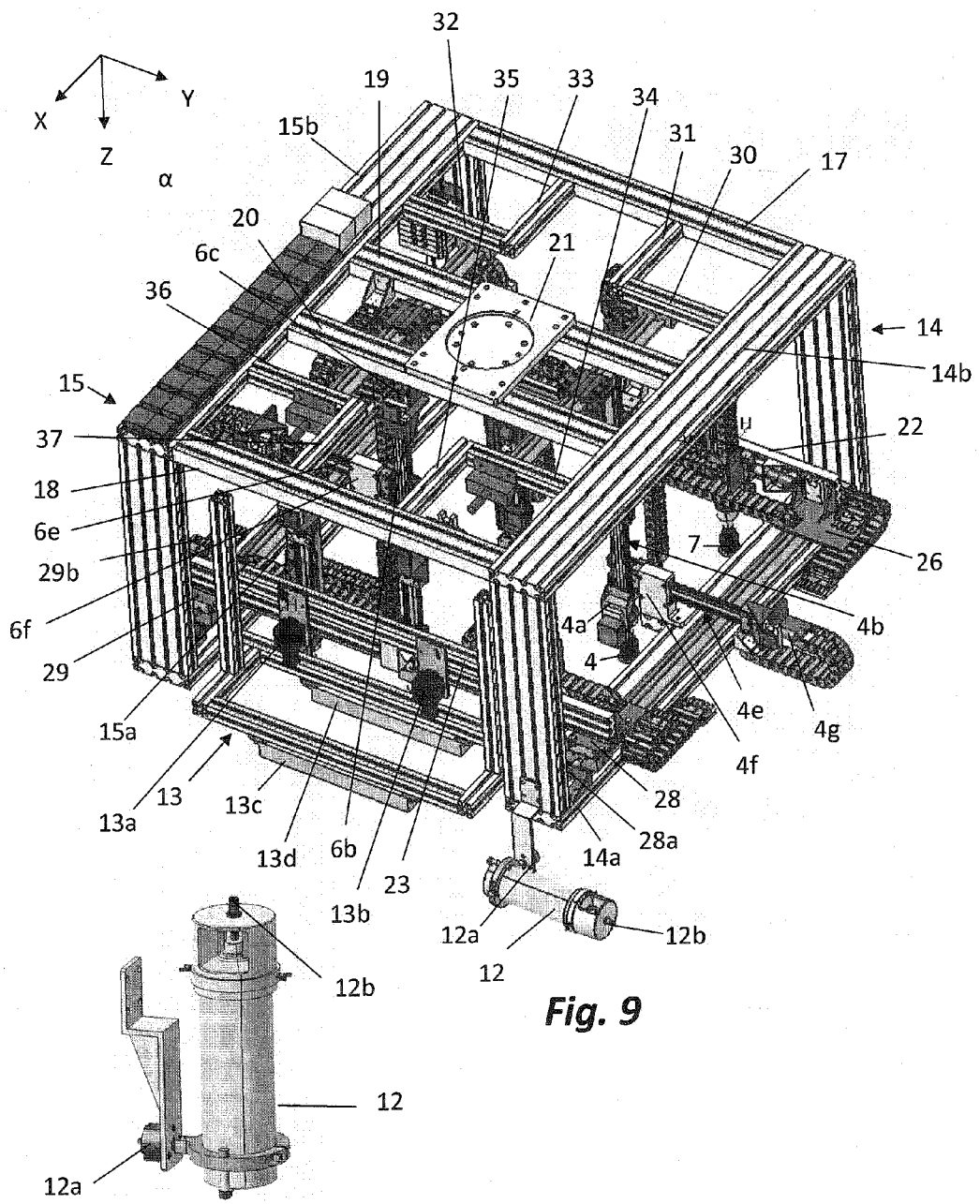
FIG. 9 is an upper perspective view of the rear part of the gripping device shown in FIG. 2, further provided with a computer vision module and an adhesive applicator module.
FIG. 10 is an enlarged view of the adhesive applicator module shown in FIG. 9.
Figure 11:
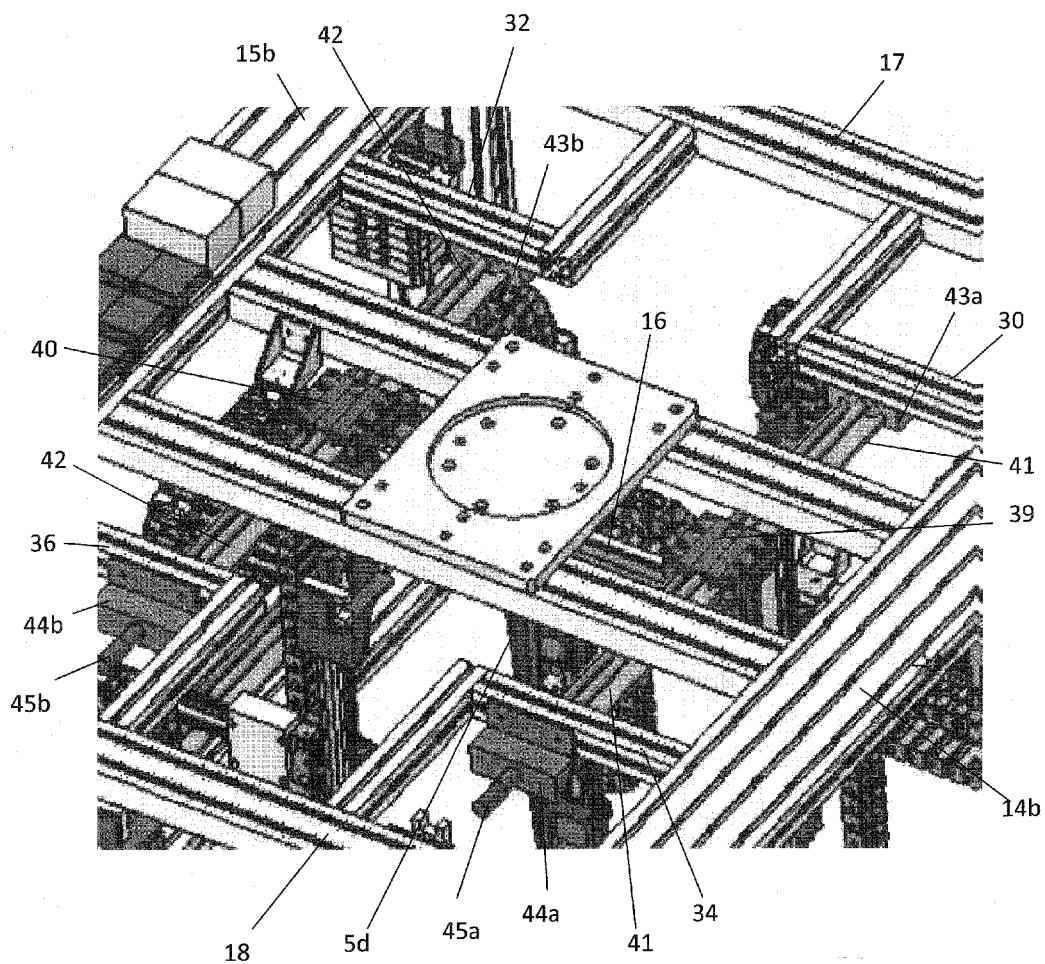
FIG. 11 is a partial enlarged view of the upper part of the gripping device illustrated in FIG. 2.
Figure 12:
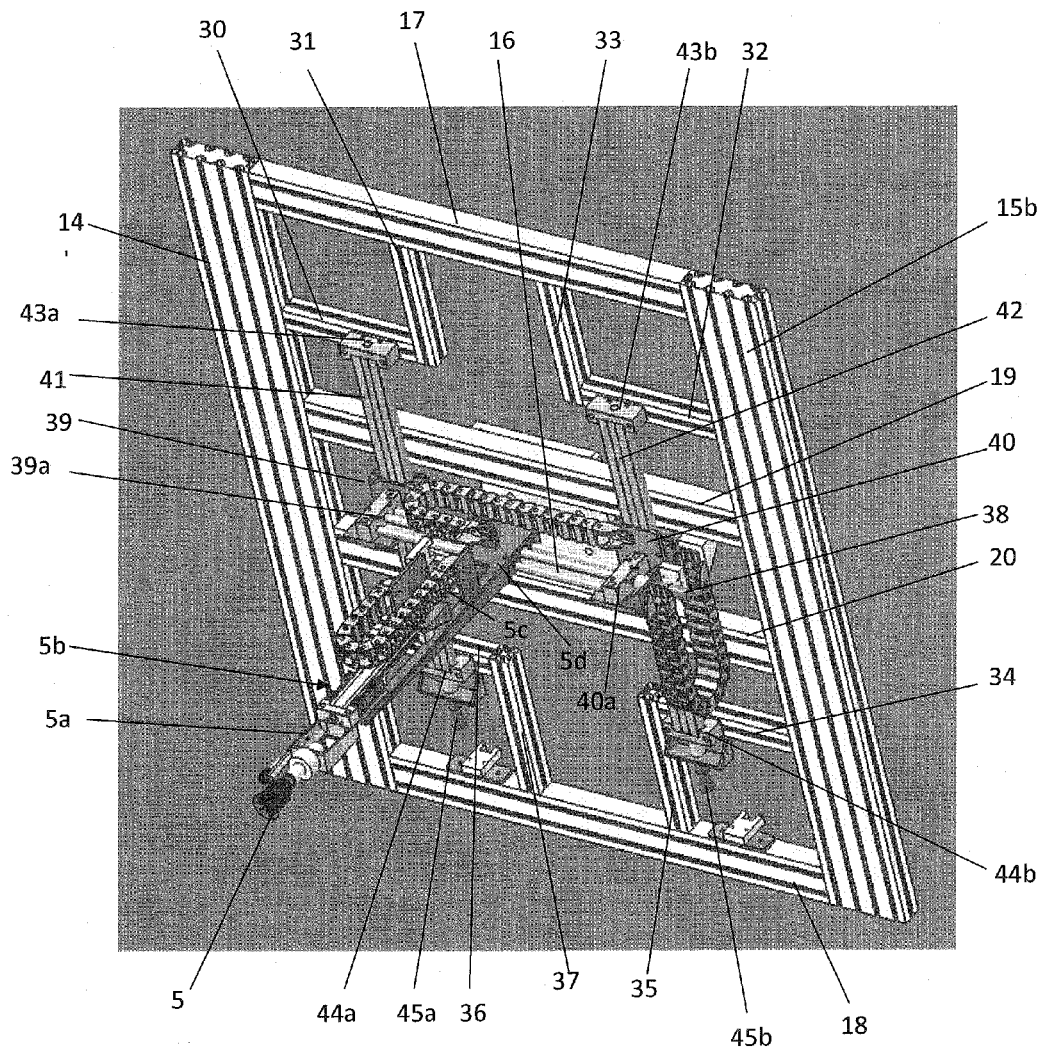
FIG. 12 is a bottom perspective view of the lower part of the main rack, of the multiposition gripping element, and of the operating mechanisms of the multiposition gripping element.

In processes for manufacturing composites, it is necessary to place several fabric layers to make a preform. It is therefore necessary to assure that once the fabrics -10- are placed, they do not move. For this purpose, the gripping device incorporates an adhesive applicator module -12- (FIGS. 9 and 10) which, before placing the fabric -10-, sprays an adhesive in several points of the mold -11-. The adhesive applicator module is a conventional spray bottle-type element with a built-in spray nozzle. This is assembled on the main rack by means of an automatic rotating actuator -12a-, such that it is arranged vertically as long it is not required to be actuated, and rotates for orienting the sprayer with respect to the fabric when the adhesive must be applied. Once rotated, an automatic operating actuator -12b-, in this case linear, presses the nozzle to spray the adhesive.

Once the fabric -10- is placed, it will be necessary to apply pressure on the same points where the adhesive has been sprayed on the mold or on the previously placed fabric to assure proper fixing. To apply this pressure, the central multiposition suction cup -5- which, once the fabric -10- is placed, is released from the fabric -10- by cutting off the vacuum in the central multiposition suction cup -5-, and is positioned for applying the pressure at the points in which the adhesive has previously been sprayed, is used. The other suction cups -1-, -2-, -3-, -4-, -6-, -7-, -8-, -9- will continue pressing the fabric -10- onto the mold -11- until this process has ended, thus assuring proper positioning of the fabric at all times. For the purpose of assuring that the fabric -10- has been correctly placed, the gripping device incorporates a computer vision module -13- (FIG. 9) which, after obtaining several photographs of the fabric -10- in place and processing them according to advanced computer vision analysis techniques, indicates whether or not the placement was suitable. Specifically, the computer vision system consists of two cameras -13a and 13b- and an illumination system made up of lamps -13c and 13d- which allow obtaining the images of the fabric in place. A computer image processing system (not shown in the images) is responsible for the automatic analysis of said images.

In the embodiment of the gripping device shown in FIGS. 2-12, it comprises a main rack made up of two side frames -14, 15-, respectively made up of respective lower stringers -14a, 15a-, upper stringers -14b, 15b-, front posts -14c, 15c- and rear posts -14d, 15d-, and joined to one another by a front upper end cross-piece -17- and a rear upper end cross-piece -18-, two lower end cross-pieces -24, 25-, as well as two intermediate upper cross-pieces -19, 20- in the central sectors of which a coupling sheet -21- is assembled for a conventional robot arm (not shown in the drawings).

The front suction cups -1, 2, 3- are assembled in a first mobile cross-piece -22- the ends of which are coupled to respective first upper runners -26, 27- which slide in respective longitudinal tracks arranged in the upper faces of the lower stringers -14a, 15a- of the side frames -14, 15-, such that the suction cups -1, 2, 3- are jointly displaceable in direction -X- towards the suction cups -4, 5, 6-. The intermediate front suction cup -2- is assembled in a holding block -2a- connected to a vertical operating system -2b- which is displaced in the perpendicular direction -Z- by the action of a motor -2c- in a fixing device -2d- fixedly assembled in the mobile cross-piece -22- through a fixing flat bar -2e-.

Each of the end front suction cups -1, 3- is assembled in a holding block -1a, 3a- connected to a vertical operating system -1b, 3b- displaceable in the perpendicular direction -Z- by the action of a motor -1c, 3c-. Each front vertical operation -1b, 3b- is in turn displaceable in the transverse direction -Y- guided in the first mobile cross-piece -22- by means of a transverse operating mechanism -1e, 3e- comprising a motor -1f, 3f-. The end suction cups -1, 3- are pivotable in the plane -Y-Z.

On the other hand, the rear suction cups -7, 8, 9- are assembled in a second mobile cross-piece -23- the ends of which are coupled to respective second upper runners -28, 29- which also slide in respective longitudinal tracks arranged in the upper faces of the lower stringers -14a, 15a- of the side frames -14, 15-, such that the suction cups -7, 8, 9- are also jointly displaceable in direction -X- towards the suction cups -4, 5, 6-.

The intermediate rear suction cup -8- is assembled in a holding block -8a- connected to a vertical operating system -8b- which is displaced in the perpendicular direction -Z- by the action of a motor -8c-.

Each of the end rear suction cups -7, 9- is assembled in a holding block -7a, 9a- connected to a vertical operating system -7b, 9b- displaceable in the perpendicular direction -Z- by the action of respective motors -7c, 9c-. Each rear vertical operation -7b, 9b- is in turn displaceable in the transverse direction -Y- guided in the second mobile cross-piece -23- by means of a transverse operating mechanism -7e, 9e- comprising a motor -7f, 9f-. The end suction cups -7, 9- are coupled in their respective holding blocks -7a, 9a- such that they are pivotable in the transverse plane -Y-Z.

The first runners -26, 27- and the second runners -28, 29- are coupled to respective longitudinal screws -28b, 29b- operated by respective drive motors -28a, 29a-, such that the rotation of the screws -28b, 29b- in one direction or the other displaces the first runners -26, 27- in which the front mobile cross-piece -22- with the front suction cups -1, 2, 3- is assembled and the second runners -28, 29- in which the rear mobile cross-piece -23- with the rear suction cups -7, 8, 9- is assembled respectively in direction X1 and X2 from and towards the center of the gripping device.

Each of the left side intermediate suction cup -4- and right side intermediate suction cup -6- is pivotably assembled in a holding block -4a, 6a- in the transverse plane -Y-Z-, which in turn is connected to a vertical operating mechanism -4b, 6b- which is displaceable in the perpendicular direction -Z- by means of the action of a motor -4c, 6c-. The vertical operating mechanism -4b, 6b- is in turn connected to a transverse operation -4e, 6e- which, operated by a motor -4g, 6g-, is displaced in direction Y in a transverse guide profile -4f, 6f- immobilized in the respective lower stringer -14a, 15a- of the main rack.

The central multiposition suction cup -5- is assembled in a holding body -5a- connected to a vertical operating mechanism -5b- comprising a motor -5c- The vertical operating mechanism -5b- is in turn assembled in a vertical support -5d- displaceable in the transverse direction -Y- in a transverse guiding system -16-, which can comprise a transverse guide and a screw, by the action of a motor -38-. The ends of the transverse guiding system -16- are connected to respective lower vertical extensions -39a, 40a- of respective carriages -39, 40- which in turn slide in respective longitudinal tracks -41, 42- such that the central multiposition suction cup can also be displaced in the longitudinal direction -X- by means of the action of respective motors -45a, 45b-.

The first ends of each of the longitudinal tracks -41, 42- are coupled to respective first coupling bodies -43a, 43b- and at their second ends to respective second coupling bodies -44a, 44b-. The first left coupling body -43a- is assembled in a left front cross-bar -30- assembled in the left upper stringer -14b- the free end of which is joined to a left front longitudinal bar -31- joined to the front upper cross-piece -17-, whereas the first right coupling body -43b- is assembled in a right front cross-bar -32- assembled in the right upper stringer -15b-, with its free end joined to a right front longitudinal bar -33- joined to the front upper cross-piece -17-. In turn, the second left coupling body -44a- is assembled in a left rear cross-bar -34- assembled in the left upper stringer -14b- the free end of which is joined to a left rear longitudinal bar -35- joined to the rear upper cross-piece -18-, whereas the second right coupling body -44b- is assembled in a right rear cross-bar -36- assembled in the right upper stringer -15b-, with its free end joined to a right rear longitudinal bar -37- joined to the rear upper cross-piece -18-.

As can also be observed in FIGS. 2-12, the gripping device is also provided with a plurality of chains, the function of which is to guide the existing electric cables and pneumatic conduits (not shown in the drawings), i.e., they are cable-holding chains which serve to prevent the cables and conduits from becoming tangled and trapped with the tracks, etc.

As can be observed, it is perfectly possible to perform the operations described above with reference to FIG. 1 in the manufacture of multilayer composites with the gripping device as described above with reference to FIGS. 2 to 12.

The invention claimed is:

1. A gripping device for manipulating flexible elements, comprising:
   a main rack and a plurality of gripping elements coupled in the main rack by means of respective operating mechanisms for gripping a flexible element;
   wherein the gripping device comprises at least four gripping elements for gripping the flexible element;
   wherein at least one gripping element is a multiposition gripping element independently displaceable with respect to the other gripping elements in at least one direction parallel to the plane defined by the other gripping elements by means of at least one displacement system assembled in the main rack and in a perpendicular direction to said plane by means of a vertical operating mechanism;
   wherein at least two of the other gripping elements defining said plane are independently displaceable in any direction within said plane by means of respective two-way additional displacement systems assembled in the main rack;
   wherein the gripping elements are automatically adjustable in their respective positions such that they are arranged in one and the same plane for capturing the flexible element in a flat two-dimensional configuration and, once the flexible element is captured, moving to generate a three-dimensional configuration in the flexible element without generating stretching forces on the flexible element; and
   wherein the multiposition gripping element can be deactivated independently of the other gripping elements for being released from the flexible element when placed in a mold, and is displaceable to other positions with respect to the flexible element still secured to the other gripping elements such that the multiposition gripping element is available to perform at least one additional process on the flexible element placed in the mold.

2. The gripping device according to claim 1, further comprising additional vertical operating mechanisms in which at least some of the other gripping elements are assembled for displacing them in the perpendicular direction.

3. The gripping device according to claim 1, wherein the at least four gripping elements comprises at least one front gripping element and at least one rear gripping element, and the multiposition gripping element is assembled between said at least one front gripping element and said at least one rear gripping element.

4. The gripping device according to claim 3, wherein the front gripping element is assembled in a front longitudinal displacement system assembled in the main rack, and is displaceable in the longitudinal direction of the main rack towards the multiposition gripping element.

5. The gripping device according to claim 4, wherein the front gripping element is assembled in a front transverse displacement system assembled in the front longitudinal displacement system, and is displaceable in a transverse direction of the main rack.

6. The gripping device according to claim 3, wherein said front gripping element is pivotable in an angle in a plane corresponding to a transverse direction of the main rack.

7. The gripping device according to claim 3, wherein the rear gripping element is assembled in a rear longitudinal displacement system assembled in the main rack, and is displaceable in the longitudinal direction of the main rack towards the multiposition gripping element.

8. The gripping device according to claim 7, wherein the rear gripping element is assembled in a rear transverse displacement system assembled in the rear longitudinal displacement system, and is displaceable in a transverse direction of the main rack.

9. The gripping device according to claim 7, wherein the rear gripping element is pivotable in an angle in a plane corresponding to a transverse direction of the main rack.

10. The gripping device according to claim 3, wherein the at least four gripping elements comprise two end front gripping elements.

11. The gripping device according to claim 10, wherein the end front gripping elements are assembled in the main rack through a front longitudinal displacement system for jointly displacing the end front gripping elements in a longitudinal direction towards the multiposition gripping element.

12. The gripping device according to claim 11, wherein at least one of four gripping elements is an intermediate front gripping element assembled between the two end front gripping elements in a front longitudinal displacement system.

13. The gripping device according to claim 10, wherein the end front gripping elements are assembled in the main rack each by means of a front transverse displacement system, such that each of the end front elements is individually displaceable in a transverse direction of the main.

14. The gripping device according to claim 10, wherein at least one of the end front gripping elements is pivotable in an angle in a plane corresponding to a transverse direction of the main rack.

15. The gripping device according to claim 10, wherein the at least four gripping elements comprise at least one intermediate front gripping element assembled between the two end front gripping elements.

16. The gripping device according to claim 15, wherein the intermediate front gripping element is fixedly assembled in a front longitudinal displacement system.

17. The gripping device according to claim 10, wherein the at least four gripping elements comprise respective vertical operating mechanisms for moving the front gripping elements in a perpendicular direction.

18. The gripping device according to claim 3, wherein the at least four gripping elements comprise two end rear gripping elements.

19. The gripping device according to claim 18, wherein the rear gripping elements are assembled in the main rack through a rear longitudinal displacement system for jointly displacing the end rear gripping elements in a longitudinal direction towards the multiposition gripping element.

20. The gripping device according to claim 19, wherein at least one of the four gripping elements is an intermediate rear gripping element assembled between the two end rear gripping elements in a rear longitudinal displacement system.

21. The gripping device according to claim 18, wherein the end rear gripping elements are assembled in the main rack each by means of a rear transverse displacement system, such that each of the end rear elements is individually displaceable in a transverse direction of the main rack.

22. The gripping device according to claim 18, wherein at least one of the end rear gripping elements is pivotable in an angle in a plane corresponding to a transverse direction of the main rack.

23. The gripping device according to claim 18, wherein at least one of the four gripping elements is an intermediate rear gripping element assembled between the two end rear gripping elements.

24. The gripping device according to claim 23 wherein the intermediate rear gripping element is fixedly assembled in a rear longitudinal displacement system.

25. The gripping device according to claim 18, wherein the at least four gripping elements comprise respective vertical operating mechanisms for moving the rear gripping elements in a perpendicular direction.

26. The gripping device according to claim 3, wherein the at least four gripping elements comprise at least one side gripping element assembled between said at least one front gripping element and said at least one rear gripping element.

27. The gripping device according to claim 26, wherein one of the four gripping elements is a left side gripping element and one of the four gripping elements is a right side gripping element, and the multiposition gripping element is assembled between the left side gripping element and the right side gripping element.

28. The gripping device according to claim 26, wherein each side gripping element is assembled in the main rack by means of a side transverse displacement system.

29. The gripping device according to claim 26, wherein the at least one side gripping element is pivotable in an angle in a plane corresponding to a transverse direction of the main rack.

30. The gripping device according to claim 26, further comprising a vertical operating mechanism for moving the at least one side gripping element in a perpendicular direction.

31. The gripping device according to claim 1 wherein:
the vertical operating mechanism for the multiposition gripping element is assembled in a vertical support displaceable in a transverse direction by means of a transverse displacement system for displacing the multiposition gripping element in a transverse direction;
the gripping device further comprises a transverse guiding system assembled in a longitudinal displacement system for displacing the multiposition gripping element in a longitudinal direction;
the longitudinal displacement system is assembled in a sub-structure assembled in the main rack such that the multiposition gripping element is displaceable between the other gripping elements.

32. The gripping device according to claim 31, wherein the transverse displacement system for displacing the multiposition gripping element comprises a transverse guiding system and a transverse drive motor.

33. The gripping device according to claim 32, wherein the transverse guiding system comprises a transverse guide and a transverse screw which rotates in the vertical support and is connected to the transverse drive motor.

34. The gripping device according to claim 31, wherein the longitudinal displacement system comprises:
a pair of longitudinal tracks spaced from one another, in which respective carriages, with respective lower vertical extensions in which the transverse displacement system is assembled, are displaced; and
respective longitudinal drive motors for displacing the carriages in longitudinal guides.

35. The gripping device according to claim 34, wherein each longitudinal track comprises a longitudinal guide and a longitudinal screw which rotates in one of the carriages and is connected to one of the longitudinal drive motors.

36. The gripping device according to claim 34 wherein the sub-structure is assembled between a front upper cross-piece, a rear upper cross-piece, a left upper stringer and a right upper stringer of the main rack, and comprises at least one front cross-bar and at least one rear cross-bar on which the longitudinal tracks are assembled at their respective ends.

37. The gripping device according to claim 36, wherein:
the sub-structure comprises a left front cross-bar joined to the left upper stringer, a right front cross-bar joined to the right upper stringer, a left rear cross-bar joined to the left upper stringer, and a right rear cross-bar joined to the right upper stringer;
the front cross-bars and the rear cross-bars have respective free ends facing and spaced from one another;
the front cross-bars are joined to the front upper cross-piece by means of respective front longitudinal bars and the rear cross-bars are joined to the rear upper cross-piece by means of respective rear longitudinal bars; and
the ends of each longitudinal track are joined respectively to one of the front cross-bars and to one of the rear cross-bars.

38. The gripping device according to claim 1, wherein at least one of the gripping elements is a suction cup connected to a vacuum system.

39. The gripping device according to claim 1, further comprising an adhesive applicator module assembled in the main rack, for applying adhesive in a plurality of flexible elements which are gradually placed one on top of the other in a mold.

40. The gripping device according to claim 1, further comprising a computer vision module assembled in the main rack, wherein the computer vision module verifies, after taking several photographs of a flexible element in place, whether or not the placement was suitable.

41. The gripping device according to claim 1, wherein the multiposition gripping element performs an additional process of stamping the flexible element against the mold.

42. The gripping device according to claim 1, wherein the multiposition gripping element performs an additional process of dragging the flexible element on the mold.

* * * * *